Jan. 10, 1928.

J. A. CHAMBERS 1,656,042

APPARATUS FOR CONCENTRATING ORES AND OTHER MINERALS AND MATERIALS

Filed Nov. 9, 1925

Witness: Arthur Thompson

Inventor: James Alexander Chambers

Patented Jan. 10, 1928.

1,656,042

UNITED STATES PATENT OFFICE.

JAMES ALEXANDER CHAMBERS, OF JOHANNESBURG, TRANSVAAL, SOUTH AFRICA.

APPARATUS FOR CONCENTRATING ORES AND OTHER MINERALS AND MATERIALS.

Application filed November 9, 1925, Serial No. 67,871, and in the Union of South Africa September 9, 1925.

This invention relates to machines or apparatus primarily designed for concentrating the products of finely crushed, ground or comminuted ores in order to separate the relatively heavy metalliferous particles from the relatively light non-metalliferous particles thereof. The apparatus or machine can also be utilized for separating the metalliferous particles from other loose or reduced materials or alluvial deposits having a metalliferous constituent, as well as for concentrating or separating a relatively heavy constituent from an associated lighter constituent of any other similar mixture or association of materials.

The object of the invention is to construct a machine or apparatus for the purpose specified which will be simple in construction and inexpensive to manufacture; and one that will be efficient and economical in operation.

Figure 1:
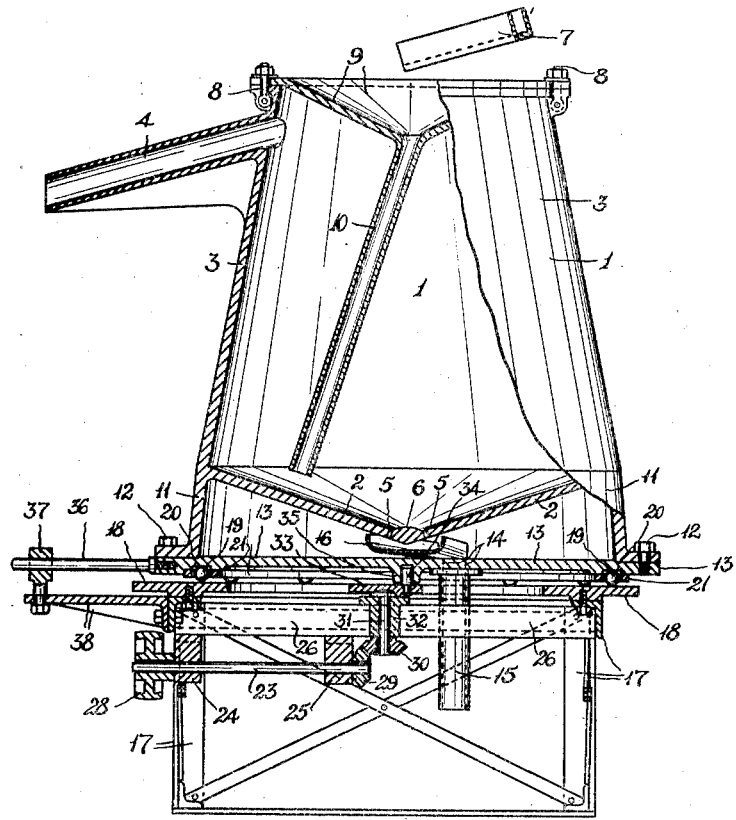
Figure 2:
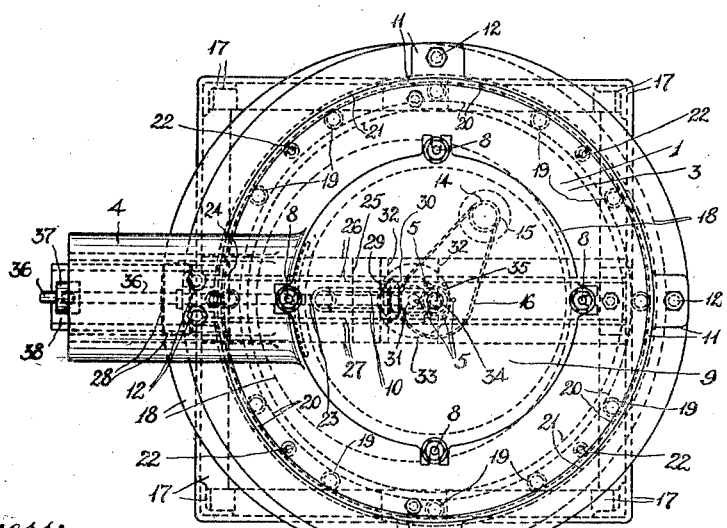

The invention will be fully explained in conjunction with the accompanying sheet of drawings, wherein, Fig. 1 is a part sectional elevation of the machine and Fig. 2 is a plan of the machine.

As illustrated in the drawings, the machine includes a pan or receptacle 1 in which the concentration of the crushed or ground ore or other material is effected. The pan or receptacle 1 is combined with means for imparting to it an irregular shaking or "panning" motion.

The concentrating pan or receptacle 1 is of inverted conical shape in its lower portion 2, and of truncated conical shape in its upper portion 3. It is provided near the top with an outlet or delivery chute 4 for the gangue, waste or lighter constituent, and at the bottom, at or near the centre of the inverted conical lower portion 2, with a plurality—six are shown—or ring of discharge passages or openings 5 for the heavy material or concentrates; certain of the passages or openings 5 may, if desired, be closed, temporarily or otherwise, by means of removable plugs. That portion of the bottom of the pan or receptacle 1 lying within the the ring of passages or openings 5 may, as shown, be raised and rounded, or form portion of a sphere, as indicated at 6, so that the concentrates will thereby be directed to the passages or openings 5.

7 in Fig. 1 represents a launder or trough for conducting the material which is to be concentrated, together with a suitable quantity of water or other liquid, to the pan 1. Upon the top of the pan 1 there is fixed, as by means of the hinged eyebolts 8, an inverted conical cover 9, which is constructed with a downwardly extending spout or tubular extension 10, which extends to within a short distance of the inverted conical bottom 2 of the pan 1, approximately midway between the wall of the upper portion 3 and the concentrates outlets 5. The parts 9, 10, serve as a funnel for receiving the material from the launder 7 and delivering it into the pan 1 at a suitable point.

The pan 1 is constructed in its lower portion with an annular extension—or a number of legs or supports—11, which serves for fixing it by means of set screws or bolts 12 upon a carrying plate 13, which is the means through which the irregular shaking or "panning" motion is imparted to the pan 1. In the plate 13 an opening 14 is provided having a vertical discharge pipe 15 for delivering the concentrates into any receptacle arranged beneath it to receive them. 16 is a fixed inclined tray or chute for receiving the concentrates after they have passed through the passages 5 and delivering the same to the discharge opening 14.

The pan 1 is operatively carried or supported by a main framework 17 through the medium of a ring or annular plate 18. The carrier plate 13 on the underside is constructed to provide housings for a plurality of balls 19; 20 being an annular recess in the bottom of the plate 13, and 21 a ring provided with a hole for each of the balls 19 and secured to the underside of the plate 13 by screws 22. The several balls 19 are free to run in contact with the top of the supporting ring 18.

The driving means for the pan 1 includes a shaft 23 carried in bearings 24, 25. fixed to cross members 26, 27, of the frame 17. 28 is a pulley on the outer end of shaft 23 for driving the same. On the other and inner end of the shaft 23 is fixed a bevel pinion 29, which drives a further bevel pinion 30 fixed on a vertical crank shaft 31, working in a bearing 32 fixed between the cross members 26, 27, of the frame. 33 is a disc crank fixed upon the upper end of the crank shaft 31 and 34 the crank pin which is vertical and projects into a hole formed in a boss 35 provided on the underside of the carrier plate 13. It will be understood that on motion being imparted to the crank 33, the crank pin 34 causes the centre of the pan 1 to move in a circular path, the pan 1 then moving freely upon the bearings provided by the balls 19.

The pan 1 at one side is slidably connected to the frame 17 or a part fixed thereto in such a way that, while it is free to be moved by the crank with its centre in a circular path, it is prevented from rotating about its own axis.

The means slidably connecting the pan 1 to the frame 17 includes a rod 36 fixed in the edge or rim of the carrier plate 13 and extending horizontally and radially from said carrier plate 13, a pivoted piece 37 which provides a sliding bearing for the rod 36, and a bracket 38 in the outer end of which the piece 37 is pivoted, said bracket being attached to the frame 17. When the circular motion is imparted to the centre of the carrier plate 13 by the crank pin 34, the rod 36 is free to slide backwards and forwards through the bearing piece 37 and so precludes the rotation of the pan 1 about its own axis.

In the operation of the machine a whirling or whirlpool motion is set up in the contents of the pan or receptacle 1, which causes the heavy particles to collect centrally at the bottom of the pan whence they pass out through the passages or openings 5, while the lighter constituent of the mixture, or gangue, and the associated liquid are discharged at the outlet provided by the delivery chute 4 near the top of the pan 1.

What I claim as my invention and desire to protect by Letters Patent is:—

1. A mineral concentrator, including a pan, means for introducing thereinto the material to be concentrated, an outlet for the lighter constituent of the mixture and associated liquid, means for withdrawing the concentrates from the bottom of the pan, a carrier plate for the pan, a supporting plate arranged below said carrier plate, balls arranged between said carrier and supporting plates, means engaging directly with the centre of the pan for causing the pan to move in a circular path, and means for preventing rotation of the pan about its own axis including a pivoted piece whose axis is fixed at some distance from the pan and means slidably connecting the side of the pan adjacent to the pivoted piece to said pivoted piece, as set forth.

2. A mineral concentrator, including a pan, means for introducing thereinto the material to be concentrated, an outlet for the lighter constituent of the mixture and associated liquid, means for withdrawing the concentrates from the bottom of the pan, a carrier plate for the pan, a supporting ring arranged below said carrier plate, balls arranged between said carrier plate and supporting ring, means engaging directly with the centre of the pan for causing the pan to move in a circular path, said latter means including a crank the crank pin of which is adapted to engage with the carrier plate at the centre thereof, and means for preventing rotation of the pan about its own axis including a pivoted piece whose axis is fixed at some distance from the pan and means slidably connecting the side of the pan adjacent to the pivoted piece to said pivoted piece, as set forth.

In testimony whereof I have signed my name to this specification.

JAMES ALEXANDER CHAMBERS.